United States Patent
Alghooneh et al.

(10) Patent No.: US 10,388,123 B2
(45) Date of Patent: *Aug. 20, 2019

(54) HAPTIC EFFECT ENABLED SYSTEM USING FLUID

(71) Applicant: Immersion Corporation, San Jose, CA (US)

(72) Inventors: Mansoor Alghooneh, Toronto (CA); Vahid Khoshkava, Laval (CA); Juan Manuel Cruz Hernandez, Westmount (CA); Mohammadreza Motamedi, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,306

(22) Filed: Sep. 7, 2018

(65) Prior Publication Data

US 2019/0012886 A1    Jan. 10, 2019

Related U.S. Application Data

(62) Division of application No. 15/254,940, filed on Sep. 1, 2016, now Pat. No. 10,109,162.

(51) Int. Cl.
*G08B 6/00* (2006.01)
*G06F 1/16* (2006.01)
*G06F 3/01* (2006.01)

(52) U.S. Cl.
CPC .............. *G08B 6/00* (2013.01); *G06F 1/163* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 7,973,434 B2 | 7/2011 | Yazawa et al. | |
| 9,378,907 B2 | 6/2016 | Rofougaran | |
| 9,841,331 B2 | 12/2017 | Wood et al. | |
| 9,898,903 B2 | 2/2018 | Khoshkava et al. | |
| 2014/0160064 A1 | 6/2014 | Yaki et al. | |
| 2014/0314976 A1 | 10/2014 | Niiyama et al. | |

(Continued)

FOREIGN PATENT DOCUMENTS

WO    2015035317 A1    3/2015

OTHER PUBLICATIONS

M. Wang et al., "A reconfigurable liquid metal antenna driven by electrochemically controlled capillarity", Journal of Applied Physics 117, 194901 (2015), 6 pages.

(Continued)

*Primary Examiner* — John F Mortell
(74) *Attorney, Agent, or Firm* — Miles & Stockbridge P.C.

(57) ABSTRACT

A haptic effect enabled system generates a haptic effect using an electric potential responsive fluid. A haptic enabled apparatus includes a fluid and a substrate. The fluid is responsive to an electric field. The substrate is at least partially flexible and defines a channel. The fluid is positioned within at least a portion of the channel. A portion of the substrate proximal to the fluid is stiffer than a portion of the substrate spaced from the fluid, thereby creating a haptic effect.

20 Claims, 10 Drawing Sheets

(56) References Cited

U.S. PATENT DOCUMENTS

| | | | |
|---|---|---|---|
| 2014/0320431 A1* | 10/2014 | Cruz-Hernandez | G06F 3/016 |
| | | | 345/173 |
| 2015/0357078 A1* | 12/2015 | Lessing | G01L 1/20 |
| | | | 73/774 |
| 2016/0103488 A1 | 4/2016 | Levesque et al. | |
| 2016/0103489 A1 | 4/2016 | Cruz-Hernandez et al. | |
| 2016/0147333 A1 | 5/2016 | Levesque et al. | |
| 2016/0153508 A1 | 6/2016 | Battlogg | |
| 2016/0179198 A1 | 6/2016 | Levesque et al. | |
| 2016/0179199 A1 | 6/2016 | Levesque et al. | |
| 2016/0187977 A1 | 6/2016 | Cruz-Hernandez et al. | |
| 2016/0187988 A1 | 6/2016 | Levesque et al. | |
| 2016/0189492 A1 | 6/2016 | Hamam et al. | |
| 2016/0216767 A1 | 7/2016 | Modarres et al. | |
| 2016/0224114 A1 | 8/2016 | Vanhelle et al. | |
| 2018/0000685 A1* | 1/2018 | Maloney | A61H 23/00 |

OTHER PUBLICATIONS

Shi-Yang Tang et al., "Liquid metal enabled pump", PNAS, vol. 111, No. 9, Mar. 4, 2014, pp. 3304-3309.

Ryan C. Gough et al., "Rapid electrocapillary deformation of liquid metal with reversible shape retention", Micro and Nano Systems Letters (2015) 3:4, pp. 1-9.

IEEE Spectrum, "Shape-shifting Liquid-Metal Antennas", Posted Aug. 21, 2015, Available at: http://spectrum.ieee.org/video/telecom/wireless/shapeshifting-liquidmetal-antennas, 4 Pages.

AIP Publishing, "Tunable Liquid Metal Antennas", Journal of Applied Physics, Retrieved on: May 19, 2015, Available at: https://www.aip.org/publishing/journal-highlights/tunable-liquid-metal-antennas, 4 Pages.

Any information that are not included with this Information Disclosure Ststement can be found in U.S. Appl. No. 15/254,940.

* cited by examiner

HAPTIC EFFECT ENABLED SYSTEM USING FLUID

PRIORITY APPLICATION

This application is a divisional of U.S. patent application Ser. No. 15/254,940, filed on Sep. 1, 2016, which has been incorporated herein by reference in its entirety.

BACKGROUND

Haptic effects are used to enhance the interaction of an individual with a haptic-enabled device such as electronic devices, wearable articles, or other types of things. They are delivered through haptic actuators and typically enable the user to experience a tactile sensation. Haptic effects can be used to simulate a physical property or to deliver information such as a message, cue, notification, or acknowledgment or feedback confirming a user's interaction with the haptic-enabled device. However, such haptic actuators consume power, which is at a premium in battery operated articles such as phones, controllers, tables, and the like. Additionally, state-of-the art haptic actuators do not always have a form factor or the flexibility that lends itself to discrete implementations in applications other than traditional electronic devices such as clothing, wrist bands, and other types of wearable articles.

SUMMARY

In general terms, this disclosure is directed to a haptic actuator that uses fluid to increase the stiffness of a flexible substrate to deliver a haptic effect.

One aspect is a haptic enabled apparatus including a fluid and a substrate. The substrate is at least partially flexible and defines a channel. The fluid is positioned within at least a portion of the channel. A portion of the substrate proximal to the fluid is stiffer than a portion of the substrate spaced from the fluid. The fluid moves through the channel in response to a predetermined field, and the stiffness of the substrate changes in response to the moving fluid to deliver a haptic effect.

Another aspect is a method of automatically generating a haptic effect. The method comprises: generating a field, the field embodying information to communicate to a user through a haptic effect; moving fluid through a channel defined in a flexible substrate in response to the field; increasing the stiffness of at least a portion of the substrate in response to the fluid moving through the channel, the increased stiffness generating the haptic effect and communicating the information.

Another aspect is a haptic enabled apparatus wearable by a person. The apparatus comprises a wearable article and a fluid responsive to a field. The fluid comprises a liquid metal and an electrolyte. A substrate is operably connected to the wearable article, and the substrate is at least partially flexible and defines a channel. The fluid is positioned within at least a portion of the channel, and a portion of the substrate proximal to the fluid is stiffer than a portion of the substrate spaced from the fluid. First and second electrodes are proximal to opposite ends of the channel. A controller is electrically connected to the first and second electrodes and is configured to generate an electrical signal. The electrical signal embodies information to communicate through a haptic effect. The electrical signal generates a field when applied to the first and second electrodes. When the field has one polarity, an oxide is deposited on the liquid metal and the liquid metal flows through the channel in one direction and increases stiffness of the substrate to deliver the haptic effect and communicate the information. When the field has an opposite polarity, the oxide is removed from the liquid metal and the liquid metal flows through the channel in an opposite direction and stiffness of the substrate is decreased.

DETAILED DESCRIPTION

Figure 1:
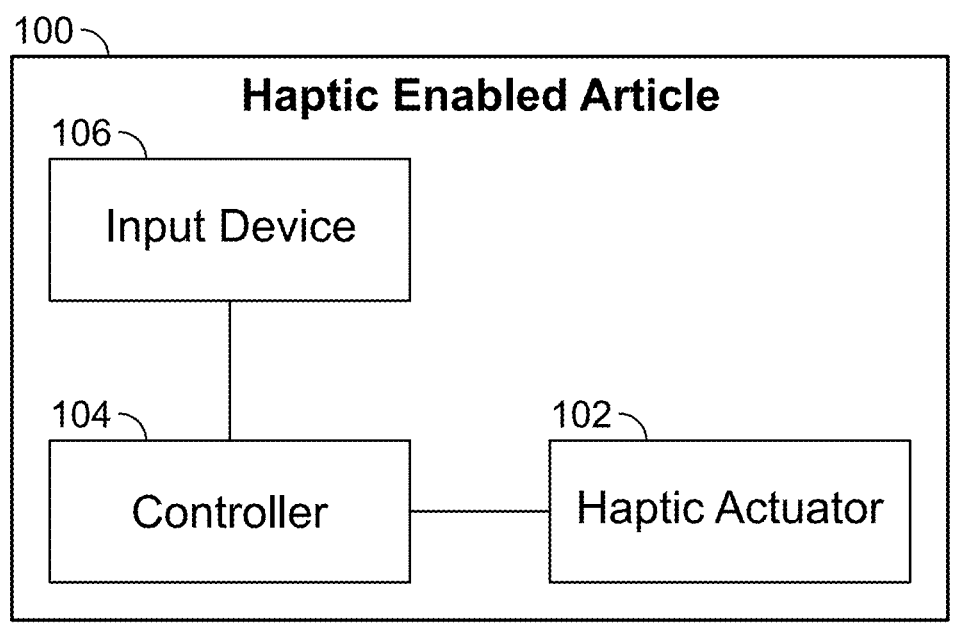
FIG. 1 is a block diagram of a haptic enabled system in accordance with an exemplary embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. Terms such as "comprise," "comprises," "comprising," "include," "includes," "including," "such as," "has," and "having" are interchangeable and not intended to be limiting. For example, the term "including" shall mean "including, but not limited to."

In general, the present disclosure relates to a haptic-enabled apparatus that employs a fluid to generate a haptic effect. In an exemplary embodiment, the apparatus comprises a substrate that defines a channel through which the fluid can flow. A pump mechanism moves the fluid through the channel. As fluid moves through the channel, pressure increases in the portion of the channel proximal to the fluid and the portion of the substrate proximal to the fluid becomes stiffer. Such a change in stiffness can deliver a tactile sensation to a user and thus deliver a haptic effect. As discussed in more detail, the pump mechanism can be any type of mechanism, electrochemical process, capillary mechanism, or other phenomenon or action that can cause fluid to flow. Examples of such pump mechanisms and processes include electrodes, electrochemical reactions, and mechanical mechanisms.

A haptic effect can be any type of tactile sensation delivered to a person. In some embodiments, the haptic effect embodies information such as a cue, notification, feedback or confirmation of a user's interaction with a haptic-enabled article, or a more complex message or other information. In alternative embodiments, the haptic effect can be used to enhance a user's interaction with a device by simulating a physical property or effect such as friction, flow, and detents.

FIG. 1 illustrates a block diagram of one of many possible embodiments of a haptic-enabled article 100. In the specific embodiments disclosed herein, the haptic-enabled article 100 is a wearable article that includes a haptic actuator 102, a controller 104, and an input device 106. The haptic enabled article 100 can be any type of article that can be used to deliver haptic effects to a person. For example, the haptic-enabled article 100 can be a wearable article such as shirts; pants; shoes and other footwear; coats, jackets and other outerwear; hats; belts and suspenders; neckties; scarves; athletic equipment; safety and protective equipment such as helmets, protective vests, and body armor; medical devices and fitness trackers such as heart rate monitors, pedometers, ambulatory infusion pumps, glucose meters, insulin pumps; jewelry; watches and watchbands; eyeglasses and goggles; virtual reality headsets; prosthetics such as artificial limbs; accessories such as purses and wallets; and anything else that can be carried on the body or in clothing. Although wearable articles are disclosed herein, the haptic-enabled article 100 also can be other things such as cell phones; computers; tablets; electronic games; game controllers; pointers such a mouse or pen; cases and covers for electronic devices; and other things and electronic devices.

In some embodiments and as illustrated in FIG. 1, the actuator 102, the controller 104, the input device 106, and the haptic enabled article 100 are incorporated into a single device, which can be worn or carried by a user. In other embodiments, at least one of the actuator 102, the controller 104, and the input device 106 are separately arranged from the others and connected to each other either wirelessly or by wire.

The controller 104 is any type of circuit that controls operation of the actuator 102 based on receiving a signal or data from the input device 106. Data can be any type of parameters, instructions, flags, or other information that is processed by the processors, program modules, and other hardware disclosed herein.

The input device 106 operates to monitor or detect one or more events associated with a user of the haptic enabled article 100, or performed by the user, of which the user can be informed with a haptic feedback. The input device 106 is any device that inputs a signal into the controller 104. An example of an input device 106 is a control device such as a switch or other type of user interfaces. Another example of an input device 106 is a transducer that inputs a signal into the controller 104. Examples of transducers that can be used as an input device 106 include antennas and sensors. Various embodiments can include a single input device or can include two or more input devices. Additionally, various embodiments can include different types of input devices. For example, at least some possible embodiments include a switch and a transducer such as an antenna or a sensor. When the input device 106 is stimulated and inputs a signal to the controller 104, the controller 104 operates the actuator 102 to provide a haptic effect to the person wearing or interacting with the article 100.

Figure 2:
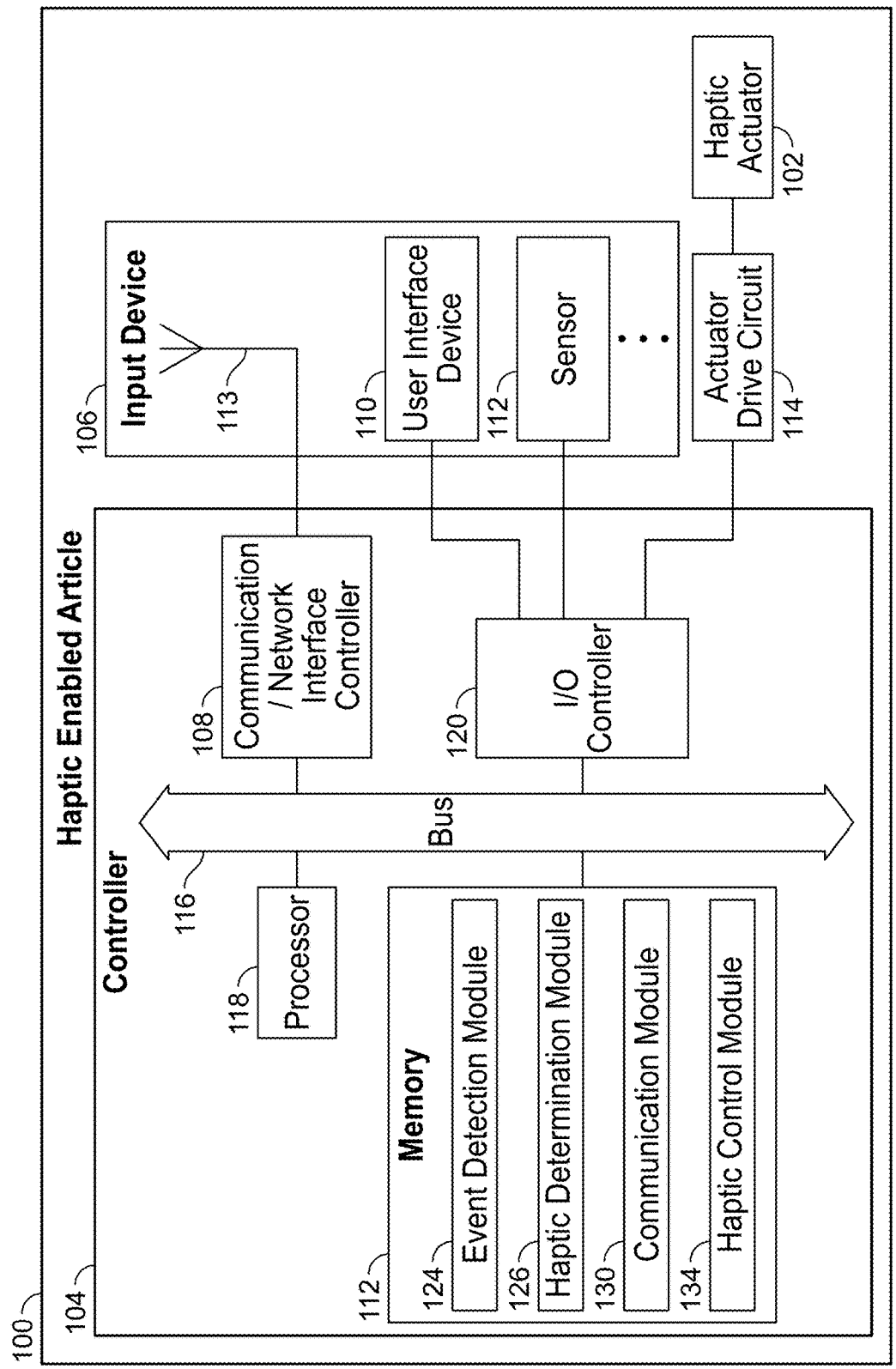
FIG. 2 illustrates a more detailed block diagram of a possible embodiment of the haptic enabled device as illustrated in FIG. 1.

FIG. 2 illustrates a more detailed block diagram of a possible embodiment of the haptic enabled article 100 (also referred to herein as a wearable article) as illustrated in FIG. 1.

In this embodiment, as discussed in FIG. 1, the article 100 includes the haptic actuator 102, the controller 104, and the input device 106. Examples of the input device 106 can include one or more user interface devices 110, a sensor 112, and an antenna 113. Various embodiments can include just one of these input devices 106 or combinations of a user interface 110, sensor 112, or antenna 113. Various embodiments also can include multiple input devices of the same type. For example, an embodiment can include two sensors 112. The input device 106 is in electrical communication with the controller 104. An actuator drive circuit or device 114 is in electrical communication with the controller 104 and the actuator 102.

Various embodiments of the actuator 102 are disclosed in more detail herein. An advantage of the actuators 102 disclosed herein is that they improve flexibility and require less power to be actuated than many other types of haptic actuators.

The user interface devices 110 include any device or mechanism through which a user can view information, or input commands or other information into the haptic enabled article 100. Examples of user interface devices 110 include touchscreens, cameras, mechanical inputs such as buttons and switches, and other types of input components.

The sensor 112 can be any instrument or other device that outputs a signal in response to receiving a stimulus. The sensor 112 can be hardwired to the controller 104 or can be connected to the controller 104 wirelessly. The sensor 112 can be used to detect or sense a variety of different conditions, events, environmental conditions, the operation of condition of an article, the presence of other people or objects, or any other condition or thing capable of stimulating a sensor.

Examples of sensors 112 include acoustical or sound sensors such as microphones; vibration sensors; chemical and particle sensors such as breathalyzers, carbon monoxide and carbon dioxide sensors, and Geiger counters; electrical and magnetic sensors such as voltage detectors or hall-effect sensors; flow sensors; navigational sensors or instruments such as GPS receivers, altimeters, gyroscopes, or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; force sensors such as piezoelectric sensors and strain gauges; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, the sensors 112 can be formed with smart materials, such as piezo-electric polymers, which in some embodiments function as both a sensor and an actuator.

The actuator drive circuit 114 is a circuit that receives a haptic signal (also referred to herein as a drive signal) from the controller 104. The haptic signal embodies haptic data associated with haptic effects, and the haptic data defines parameters the actuator control circuit 114 uses to generate a haptic actuation signal. In exemplary embodiments, such parameters relate to, or are associated with, electrical characteristics. Examples of electrical characteristics that can be defined by the haptic data includes frequency, amplitude, phase, inversion, duration, waveform, attack time, rise time, fade time, and lag or lead time relative to an event. The haptic actuation signal is applied to the actuator 102 to define movement of fluid in the actuator 102 and thus provide one or more haptic effects.

In one embodiment, the haptic actuation signal is a signal that applies a potential across two or more electrodes as discussed in more detail herein. In other embodiments, the actuation signal is applied to and drives an electromechanical pump or other possible pumping mechanism.

The controller 104 comprises a bus 116, processor 118, input/output (I/O) controller 120, and memory 122. The bus 116 includes conductors or transmission lines for providing a path to transfer data between the components in the controller 104 including the processor 118, memory 112, and I/O controller 120. The bus 116 typically comprises a control bus, address bus, and data bus. However, the bus 116 can be any bus or combination of busses, suitable to transfer data between components in the controller 104.

The I/O controller 120 is circuitry that monitors operation of the controller 104 and peripheral or external devices such as the user interface devices 110, the sensor 112 and the actuator drive circuit 114. The I/O controller 120 also manages data flow between the controller 104 and the peripheral devices and frees the processor 118 from details associated with monitoring and controlling the peripheral devices. Examples of other peripheral or external devices with which the I/O controller 120 can interface includes external storage devices; monitors; input devices such as keyboards and pointing devices; external computing devices; antennas; other articles worn by a person; and any other remote devices.

The processor 118 can be any circuit configured to process information and can include any suitable analog or digital circuit. The processor 118 also can include a programmable circuit that executes instructions. Examples of programmable circuits include microprocessors, microcontrollers, application specific integrated circuits (ASIC), programmable gate arrays (PLA), field programmable gate arrays (FPGA), or any other processor or hardware suitable for executing instructions. In various embodiments, the processor 118 can be a single unit or a combination of two or more units. If the processor 118 includes two or more units, the units can be physically located in a single controller or in separate devices.

The memory 122 can include volatile memory such as random access memory (RAM), read only memory (ROM), electrically erasable programmable read only memory (EEPROM), flash memory, magnetic memory, optical memory, or any other suitable memory technology. The memory 122 also can include a combination of volatile and nonvolatile memory.

The memory 122 can store a number of program modules for execution by the processor 118, including an event detection module 124, a haptic determination module 126, a haptic control module 134, and a communication module 130. Each module is a collection of data, routines, objects, calls, and other instructions that perform one or more particular task. Although certain modules are disclosed herein, the various instructions and tasks described herein can be performed by a single module, different combinations of modules, modules other than those disclosed herein, or modules executed by remote devices that are in communication, either wirelessly or by wire, with the controller 104.

The event detection module 124 is programmed to receive data from the sensor 112, the antenna, or a remote device. Upon receiving the data, the event detection module 124 determines whether the received data relates to an event, condition, or operating state associated with a haptic effect.

Upon identification of an event associated with a haptic effect, the haptic determination module 126 analyzes the data received from the sensor 112, antenna, or remote device to determine a haptic effect to deliver through the actuator 102. An example technique the haptic determination module 126 can use to determine a haptic effect includes rules programmed to make decisions to select a haptic effect. Another example includes lookup tables or databases that relate haptic effects to data received from the sensor or antenna.

The haptic control module 134 obtains haptic data corresponding to the haptic effect identified by the haptic determination module 126. As noted herein, the haptic data corresponds to the determined haptic effect and define parameters or electrical characteristics used to generate the haptic actuation signal applied to the haptic actuator 102. The haptic control module 134 can obtain the haptic data from memory or calculate the haptic data. The haptic control module communicates the haptic data to the I/O controller 120, which then generates a haptic signal embodying the haptic data. The I/O controller communicates the haptic signal to the Actuator Drive Circuit 114 which amplifies the haptic signal to generate the haptic actuation signal and applies the haptic actuation signal to the actuator 102. The I/O controller 120 and the actuator drive signal may perform additional processing to the haptic data, haptic signal, and actuator drive signal.

The communication module 130 facilitates communication between the controller 104 and remote devices. Examples of remote devices include computing devices, sensors, other wearable articles, networking equipment such as routers and hotspots, vehicles, exercise equipment, and smart appliances. Examples of computing devices include servers, desktop computers, laptop computers, tablets, smartphones, home automation computers and controllers, and any other device that is programmable. The communication can take any form suitable for data communication including communication over wireless or wired signal or data paths. In various embodiments, the communication module may configure the controller 104 as a centralized controller of wearable articles or other remote devices, as a peer that communicates with other wearable articles or other remote devices, or as a hybrid centralized controller and peer such that the controller can operate as a centralized controller in some circumstances and as a peer in other circumstances.

Alternative embodiments of the program modules are possible. For example, some alternative embodiments might have more or fewer program modules than the event detection module 124, haptic determination module 126, communication module 130, and haptic control module 134. For example, the controller 104 can be configured to deliver only a single haptic effect. Such embodiments might not have a haptic determination module 126, and the event detection module 124 or some other module would cause the haptic control module 134 to send only a single set of haptic data to I/O controller 120. In other alternative embodiments, there is no event detection module 124 and the haptic control module 134 sends haptic data to the I/O controller 120 upon the controller 104 receiving any input from the sensor 112.

In some possible embodiments, one or more of the program modules are in remote devices such as remote computing devices or other wearable articles. For example, the event determination module 124 can be located in a remote computing device, which also stores a library of events corresponding to haptic effects and rules that define when to deliver a haptic effect. In such an embodiment, the controller 104 communicates data to the remote device when the event detection module 124 determines that a haptic effect should be delivered through the actuator 102. The data might be as simple as a flag indicating that the controller 104 received an input from the sensor 112, or more complex such as identifying the type of condition indicated by the sensor 112 or identifying the type of sensor 112 from which an input signal was received. The haptic determination module 126 on the remote device will process the data and instructions, retrieve matching haptic data from memory 122, and then transmit the haptic data to the controller 104 for processing and generating a haptic effect through the actuator 102. In yet other possible embodiments, the event detection module 124 is also located in a remote device, in which case the controller 104 communicates data to the remote device when it receives input from the sensor 112.

In one embodiment, the haptic enabled article 100 further includes a network interface controller (NIC) 108. An antenna 113 is in electrical communication with the NIC 108 and provides wireless communication between the controller 104 and remote devices. The communication module 130 is programmed to control communication through the antenna 113 including processing data embodied in signals received through the antenna 113 and preparing data to be transmitted to remote devices through the antenna 113. Communication can be according to any wireless transmission techniques including standards such as Bluetooth, cellular standards (e.g., CDMA, GPRS, GSM, 2.5G, 3G, 3.5G, 4G), WiGig, IEEE 802.11a/b/g/n/ac, IEEE 802.16 (e.g., WiMax).

The NIC 108 also can provide wired communication between the controller 104 and remote devices through wired connections using any suitable port and connector for transmitting data and according to any suitable standards such as RS 232, USB, FireWire, Ethernet, MIDI, eSATA, or thunderbolt.

Figure 3:
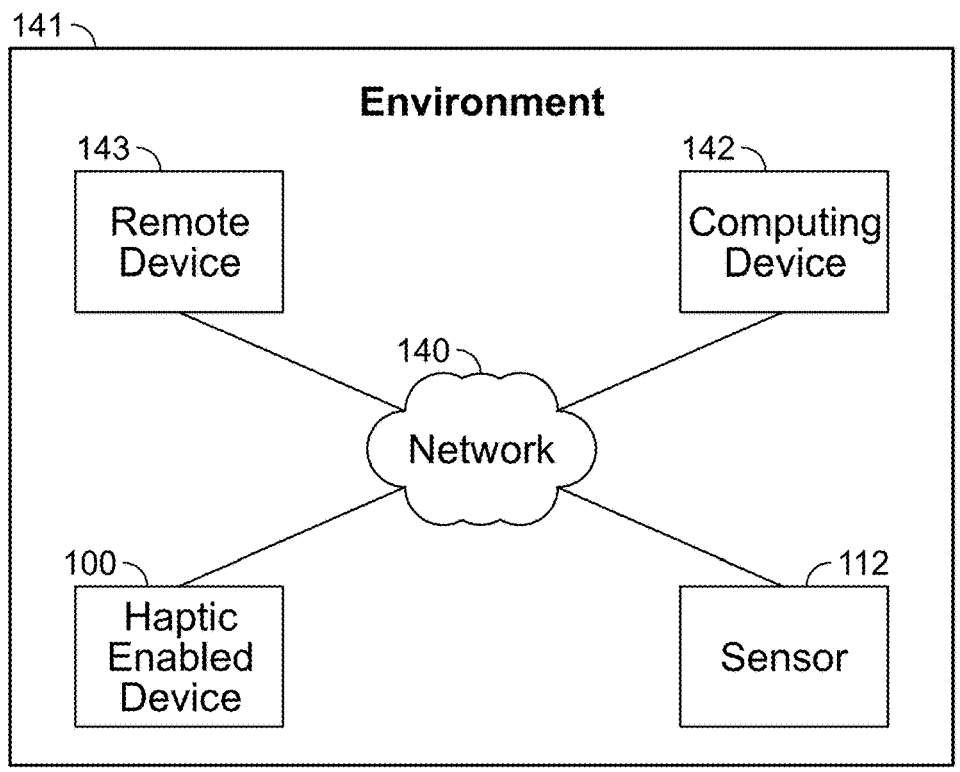
FIG. 3 is a block diagram illustrating a networked environment in which the haptic enabled devices illustrated in FIGS. 1 and 2 can operate.

FIG. 3 is a block diagram illustrating a networked environment 141 in which the haptic enabled article 100 illustrated in FIGS. 1 and 2 can operate. As illustrated, the haptic enabled article 100 can operate within and communicate with a network 140 and remote devices. Examples of remote devices include computing devices 142, sensors 112, and other remote devices 143 such as other wearable articles, medical devices, fitness monitors and equipment, vehicles, smart appliances, and other devices. In other embodiments, the network 140 provides data communication with different combinations of remote devices or remote devices other than those disclosed herein.

The network 140 operates in an environment 141 in which the haptic enabled article 100 would be worn such as in a building, an automobile or other vehicles, or a defined area in the outdoors. Additionally, in various embodiments, the network 140 is a public network, private network, local area network, wide area network such as the Internet, or some combination thereof.

In various embodiments, the computing device 142 communicates with the controller 104 on the haptic enabled article 100. In such embodiments, the computing device 142 executes program modules to process data and communicates data to the controller 104. For example, the computing device 142 receives input from a sensor 112, which could be in the haptic enabled article 100 or remote from the haptic enabled article 100. The computing device 142 then communicates the sensor data to the controller 104 in the haptic enabled article 100 for processing and generation of the haptic actuation signal. In another example, the computing device 142 receives data from one wearable article and relays that data to the controller in another wearable article to coordinate the delivery of haptic effects between different wearable articles. In another example, the computing device 142 receives data from other remote device 143 such as a smart appliance or exercise equipment and relays that data to the controller in the wearable article. In yet another possible embodiment, the controller 104 in the haptic enabled article 100 communicates data such as sensor readings to the computing device 142, which then determines whether to deliver a haptic effect or what haptic effect to deliver. The computing device 142 then returns appropriate data to the controller 104. Additionally, in various embodiments, the haptic data defining the haptic effect and defining the parameters for the haptic actuation signal can be determined by the computing device 142

Figure 4A:
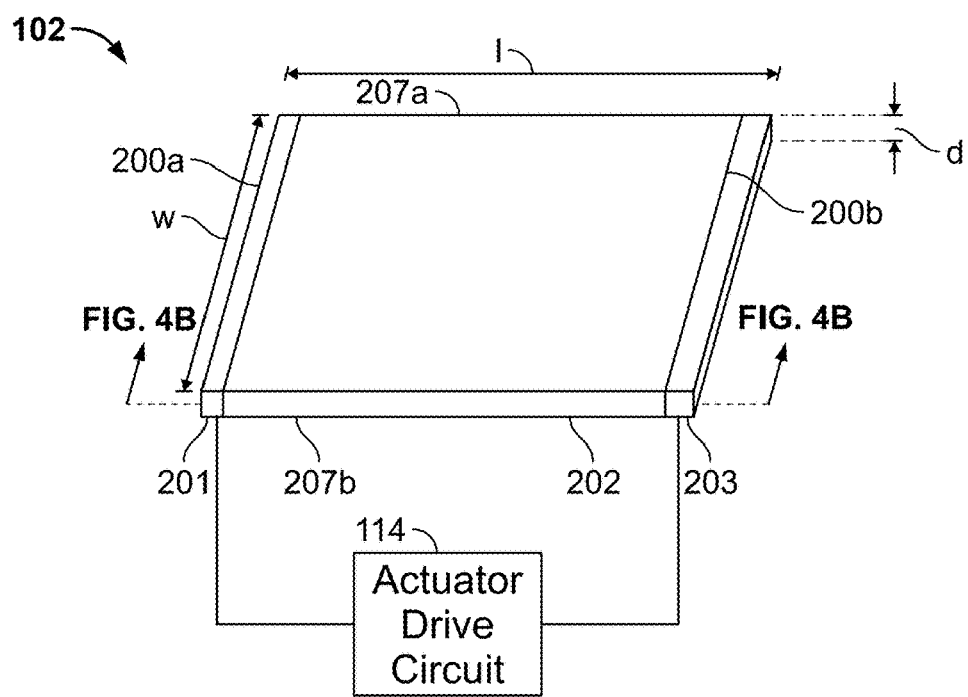
FIG. 4A is a schematic diagram of an exemplary embodiment of the haptic actuator.
Figure 4B:
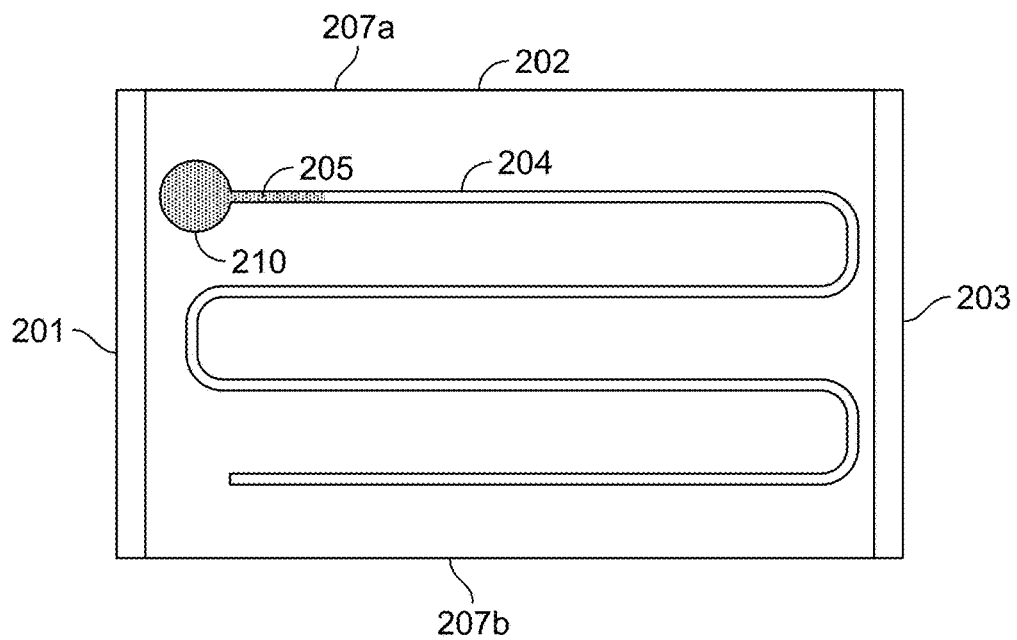
FIG. 4B is a cross sectional view of the haptic actuator of FIG. 4A.

Referring now to FIGS. 4A and 4B, the actuator 102 includes a substrate 202 defining a channel 204 and a reservoir 210 in fluid communication with the channel 204. A fluid 205 is held within the reservoir 210 and selectively flows from the reservoir 210 and through the channel 204, and then back into the reservoir 210.

First and second electrodes 201 and 203 are positioned proximal to oppositely disposed portions of the substrate 202. When an electrical potential is applied to the first and second electrodes 201 and 203, they generate an electrical field. The first and second electrodes 201 and 203 are arranged and sized so that when they are energized with a predetermined electrical potential, the channel 204 and reservoir 210 will be positioned entirely within the electrical field, although in alternative embodiments portions of the channel may be located outside of the electric field. Additionally, although the first and second electrodes 201 and 203 are illustrated as being proximal to oppositely disposed portion of the substrate, the electrodes 201 and 203 can have any position such that the channel 205 is exposed to an electric field generated between the electrodes.

The substrate has oppositely disposed end portions 200a and 200b and oppositely disposed edge portions 207a and 207b. In this configuration, the substrate 202 has a length, l, substantially longer than its width, w. However, other embodiments have different shapes for the substrate 202. For example, the substrate 202 can be square, round, or irregularly shaped. The thickness or depth, d, of the substrate 202 can vary in various configurations. For example, the thickness d can depend on the size (e.g., diameter) of the channel 204. In an example embodiment, the thickness or depth, d, of the substrate 202 is about 2 mm when the channel 204 has a diameter of 0.7 mm. The substrate 202 is at least partially made of flexible and dielectric material. Examples of materials that can be used to form the substrate include elastomers, such as Elastosil available from Wacker Chemie AG (Munich, Germany).

In the exemplary embodiment illustrated in FIGS. 4A and 4B, the channel 204 has a plurality of parallel columns that form a generally zigzag path that provides a fluid path back and forth from end-to-end 200a to 200b and from edge-to-edge 207a to 207b. In this configuration, when the channel 204 is substantially filled with the fluid 205, substantially the entire substrate 202 has an increased stiffness. Increasing stiffness over substantially all of the substrate 202 will increase the haptic sensation transmitted to a user and make it more likely the user will feel the substrate 202 changes stiffness. Although a zigzag path for the channel 204 is illustrated, other embodiment can have other configurations such as a straight line, spiral paths, rectangular or circular paths, or any other path. Additionally, the channel 204 can extend across substantially the entire length and width of the substrate 202 as illustrated or across only a portion of the length and width of the substrate 202. The total length of the channel 204 and/or the number of columns in which the channel 204 is arranged are chosen depending on the length and width of the substrate 202 and a desired strength of haptic effect. For example, the more area of the substrate 202 covered by the channel 204 and the longer the channel 204, the stronger the haptic effect.

In an exemplary embodiment, the channel 204 has a diameter of about 0.1 mm to about 5 mm, which can vary depending on factors such as the type of the fluid or manufacturing tolerances. A factor that may be used to determine the cross-sectional diameter of the channel includes providing enough volume of fluid 205 in the channel 204 to change the stiffness of the substrate 202 an amount noticeable by a user. Another factor that may affect the cross-sectional area of the channel 204 is providing a relationship between the total surface tension of the fluid 205, interfacial tension between the fluid 205 and the wall of the channel 204, and cross-sectional area of the channel 204 that permits control of a capillary action of the fluid 205 and channel 204. Other embodiments, however, may not rely on capillary action to move the fluid 205 within the channel 204.

The reservoir 210 is sized so it has a volume equal to or greater than the total volume of the channel 204. In this embodiment, the reservoir 210 can hold enough fluid 205 to fill the channel 204. In alternative embodiments, the reservoir 210 has a volume smaller than the total volume of the channel 204.

Additionally, the reservoir 210 can hold a volume of fluid 205 that is equal to or smaller than the volume of the reservoir 210 so that all of the fluid 204 can be withdrawn from the channel 204 and held in the reservoir 210. Alternative embodiments can hold a volume of fluid 205 that is greater than the volume of the reservoir 210 so that some fluid 205 is still in the channel 204 when the reservoir 210 is complete filled. Yet another embodiment, the entire reservoir 210 and channel 204 are filled with fluid 205, but not enough fluid 205 that it is under pressure and increases the stiffness of the substrate 202. Because the reservoir 210 and channel 204 are filled with fluid 205, propelling additional fluid 205 from the reservoir 210 to the channel 204 increases the pressure of the fluid 205 more quickly than if the channel 204 first needs to be filled, which enables delivering a haptic effect more quickly.

The fluid 205 within the reservoir 210 and channel 204 can be any type of fluid that flows when subject to an external force such as an electric field or magnetic field. In at least some embodiments, the fluid 205 is non-compressible. In at least some embodiments, the fluid 205 is a liquid metal capable of phase shifting so that its oxidation can be controlled by exposure to electric fields. Eutectic gallium and indium (EGaIn) is an example of such a liquid metal. An example mixture of gallium and indium is 75% gallium and 25% indium with conductivity of $3.4 \times 10^6$ S/m. An advantage of EGaIn is that it is nontoxic as compare to other liquid metals such as mercury. Examples of other phase-shifting liquid metals include mercury, francium, cesium, gallium, rubidium, and alloys of these materials.

In other embodiments, the fluid 205 is a liquid that changes its stiffness after changing its phase to solid (i.e., liquid-solid transition). For example, the fluid 205 contains a liquid metal that can change shape into a solid below a predetermined temperature, or a liquid that can be crystalized at a predetermined temperature. In other examples, the fluid 205 includes a liquid that has yield strength such that the fluid 205 becomes liquid if an external shear stress is higher than the yield strength. In yet other examples, an ionic liquid is selected to induce some reversible change in mechanical properties or microstructure of the fluid 205, such as liquid metals.

Figure 5:
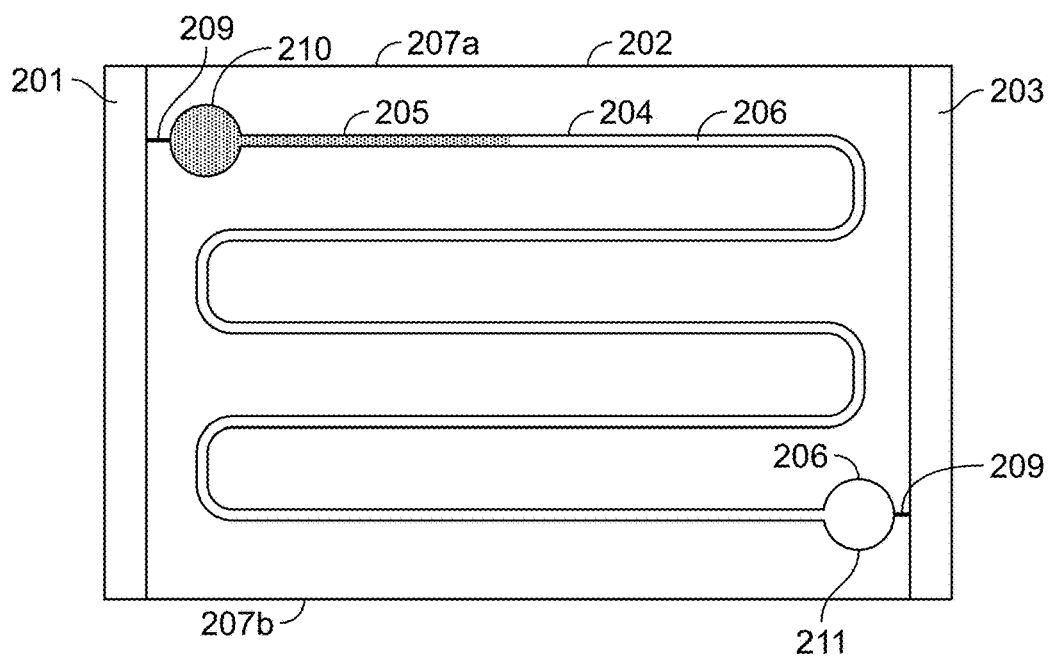
FIG. 5 is a schematic cross sectional view of an alternative example of the haptic actuator.

Referring to FIG. 5, another embodiment of the actuator 102 is similarly configured as the actuator 102 as described in FIGS. 4A and 4B and further includes a second reservoir 211 for an electrolyte 206. In this embodiment, the electrodes 201 and 203 are in contact with the first reservoir 210 and the second reservoir 211, respectively, either directly or through, for example, wires 209. For brevity, the description of the other elements and configurations are omitted.

Referring now to FIGS. 6A-6D, when the fluid comprises certain metals or other materials, the channel 204 also can be loaded with an electrolyte 206. In this embodiment, when the actuator 102 is in its relaxed state, the reservoir 210 is loaded with the liquid metal 205 and the channel 204 is loaded with an electrolyte 206. In the embodiment of FIG. 5, the first reservoir 210 is loaded with the liquid metal 205, and the second reservoir 211 is loaded with the electrolyte 206. An advantage of using an electrolyte is that it can selectively cause the fluid to oxidize, which reduces the surface tension between the fluid 205 and the wall of the channel 204 and makes it easier to move the fluid through the channel 204. Examples of an electrolyte that can be used include sodium hydroxide (NaOH), sodium chloride (NaCl), or other conductive solutions containing sodium ($Na^+$), potassium ($K^+$), calcium ($Ca^{2+}$), magnesium ($Mg^{2+}$), chloride ($Cl^-$), hydrogen phosphate ($HPO_4^{2-}$), and hydrogen carbonate ($HCO_3^-$) and etc. Other embodiments may not include an electrolyte in the channel 204. Although the exemplary embodiment illustrates an electrolyte loaded in the channel with the fluid 205, other embodiments will not include an electrolyte or any other fluid other than fluid 205.

In operation, the channel 204 can be loaded with the fluid 205 such as EGaIn on the side of the first reservoir 210 and with an electrolyte 206 on the side of the second reservoir 211. The first reservoir 210 is connected to the first electrode 201 and the second reservoir 211 is connected to the second electrode 203. A power supply through the first and second electrodes generates an electrical potential between the first and second reservoirs. In some embodiments, the electrical potential is a DC potential. Application of a positive DC potential to the fluid 205 injects the fluid into the channel and displaces the electrolyte in the channel. Reversing the voltage polarity causes the fluid 205 to withdraw toward the first reservoir 210. The speed of the movement of the fluid 205, such as EGaIn, can vary with the applied bias. By way of example, where the channel has 0.7 mm inner diameter, the EGaIn can withdraw from the channel at 3.6 mm/s using −0.7 V. The same channel can require a +7.7 V bias to inject the EGaIn at 0.6 mm/s rate. The larger voltage is necessary to drive oxidation of the surface and to overcome the potential drop through the electrolyte in the channel.

When an electrical potential is applied between the first and second reservoirs 210 and 211, the electric field causes the fluid 205 to oxidize such that oxide forms on the surface of the liquid metal. The electrolyte 206 then forms a slip layer between the oxide and the walls of the channel 204 and reduces the interfacial tension between the EGaIn and the wall of the channel 204.

Figure 6A:
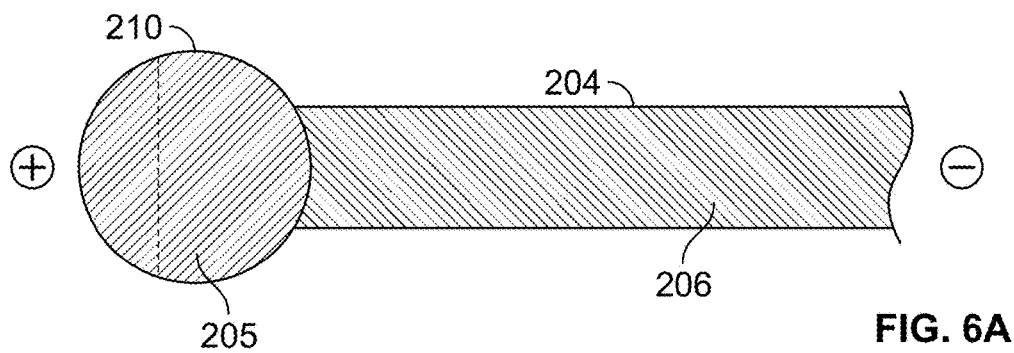
FIGS. 6A-6D illustrate operation of fluid in the actuator when under an electrical potential.
Figure 6B:
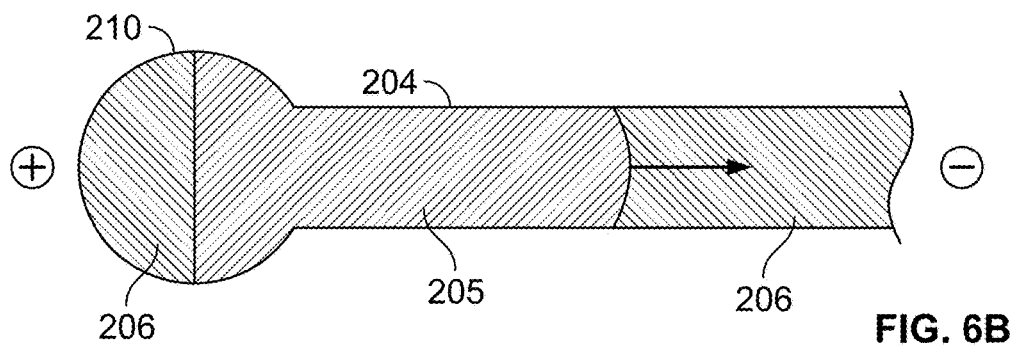
Figure 6C:
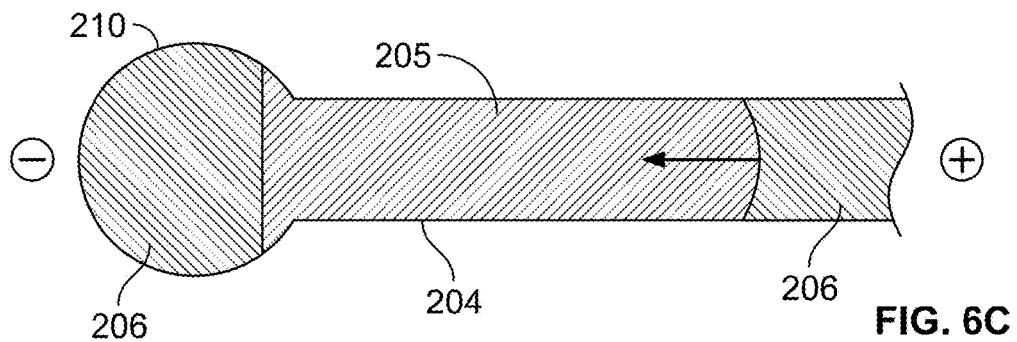
Figure 6D:
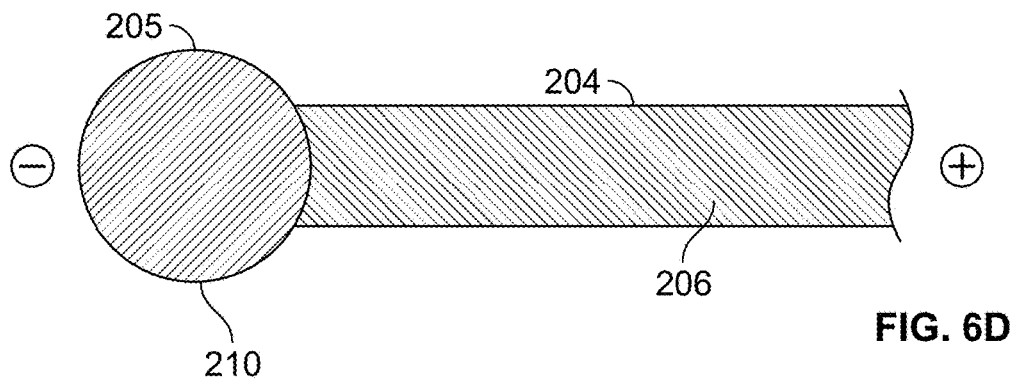

Additionally, the oxidation lowers the surface tension and energy of the fluid 205 so that it can flow past the electrolyte 206. As the surface tension and energy of the fluid 205 decreases, the Laplace pressure of the fluid 205 decreases relative to the electrolyte 206. The oxidation changes the surface energy of the fluid 205 (e.g., liquid metal) at the interface with ionic solution (e.g., the electrolyte 206). Prior to applying an external voltage, the fluid 205 in the reservoir 210 cannot move to the channel 204 due to the capillary effect resulting from the ionic solution (e.g., the electrolyte 206). When an external voltage is applied, the surface tension of the fluid 205 changes at the interface and, thus, can overcome the capillary effect from the ionic solution (e.g., the electrolyte 206) and move into the channel 204. As illustrated in the sequence illustrated from FIGS. 6A to 6B, the movement of the fluid 205 into the channel 204 causes it to stiffen the substrate 202. As the fluid 205 moves through the channel 204 the electrolyte 206 is displaced into the periphery areas from where the liquid metal was moved as illustrated in FIG. 6B. Enough fluid 205 flows into the channel 204 so that it is under pressure and it increases the stiffness of the substrate 202. When polarity of the electrical potential is switched to negative, the oxide is removed from the surface of the fluid 205 and its surface tension increases, which decreases the surface area to volume ratio of the fluid 205. As the surface tension increases, the Laplace pressure of the fluid 205 decreases relative to the electrolyte 206. As illustrated in the sequence illustrated from FIGS. 6C to 6D, the fluid 205 then moves in the opposite direction back into the reservoir 210, which reduces the stiffness and increases the flexibility of the substrate 202.

The actuator 102 can be tuned by adjusting the amplitude of the voltage applied across the first and second electrodes 201 and 203. As the amplitude of the voltage increases, the strength of the electric field increases and the fluid 205 will flow faster and exert a greater pressure against the substrate 202. This greater pressure will cause a greater stiffness of the substrate 202 and create a stronger haptic effect against the user's body. Additionally, the fast flow of the fluid 205, which is caused by the increased electric field, will decrease the lag time between application of the electric potential across the first and second electrodes 201 and 203 and movement of the fluid 205 into the channel 204. This decreased lag time provides a quicker response time for increasing the stiffness of the substrate 202 and quicker delivery of a haptic effect to the user. Additionally, in an exemplary embodiment, the flow rate and pressure of fluid 205 in the channel 204 can be determined by Poiseuille's law. By way of example, when 0.7 Volts is applied to the electrodes, Poiseuille's law calculates that the EGaIn exerts a force of 0.1 N against a channel wall when flowing through a channel having a diameter of 2 mm at a velocity of 20 cm/sec.

Figure 7:
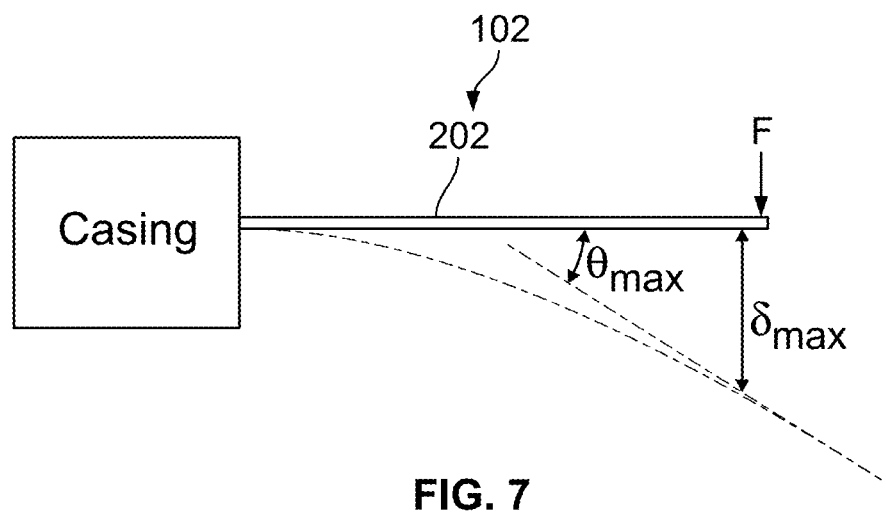
FIG. 7 schematically illustrates a side view of the substrate to describe a stiffness of the substrate.

Referring now to FIG. 7, a stiffness of the substrate 202 can be calculated with a parametric formulation as an example. In this illustration, the substrate 202 is configured as an elastomer strap. It is noted that the force is a shear force with a moving force location or action point. The action point of the shear force moves because a higher density mass (e.g., fluid 205) is moving through a lower density mass (e.g., electrolyte 206). As illustrated, a vertical maximum displacement ($\delta_{MAX}$) at the free end of the substrate 202 is described as follows in equation (1):

$$\delta_{MAX} = \frac{Fl^3}{3EI} \quad (1)$$

where F is a force, l is a length of the substrate 202, E is Young's modulus, and I is the second moment of area. A stiffness (k) of the substrate can then be calculated as follows in equation (2):

$$k = \frac{3EI}{l^3} = \frac{3E\frac{wt^3}{12}}{l^3} \quad (2)$$

where $$I = \frac{wt^3}{12},$$

w is a width of the substrate, and t is a thickness of the substrate. In an example design, where $E=0.05\times10^9$, w=20 mm, t=3 mm, and l=100 mm, k is calculated to be 6.75 N/m.

Figure 8:
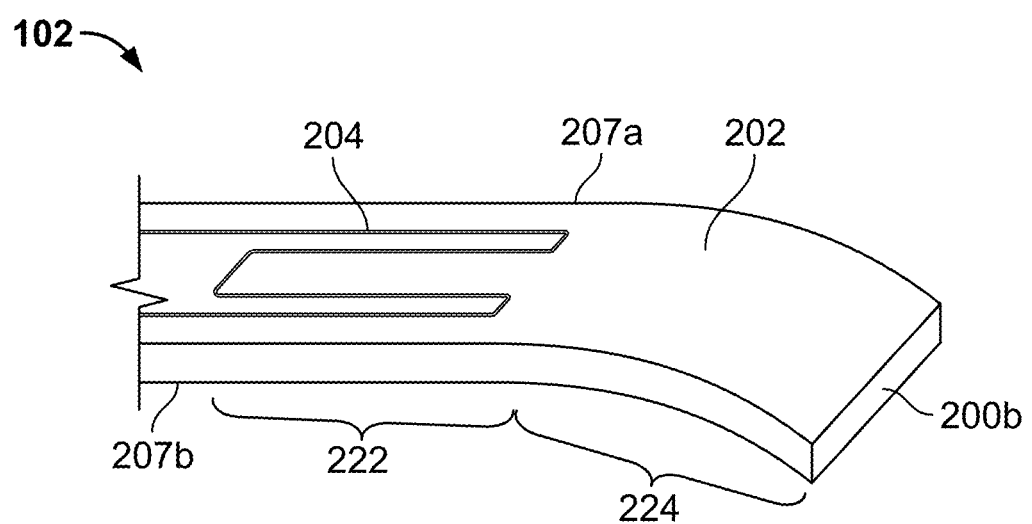
FIG. 8 schematically illustrates another exemplary embodiment of the haptic actuator.

FIG. 8 illustrates an alternative embodiment of the actuator 102. In this embodiment, the actuator 102 has an actuation portion 222 and a non-actuation portion 224. The actuation portion 222 includes a portion of the substrate 202 in which the channel 204 is defined as disclosed in more detail herein. The non-actuation portion 224 does not define a channel 205. In this embodiment, the actuation portion 222 of the actuator 102 can be selectively stiffened to generate a haptic effect, while the non-actuation portion 224 remains compliant.

Figure 9A:
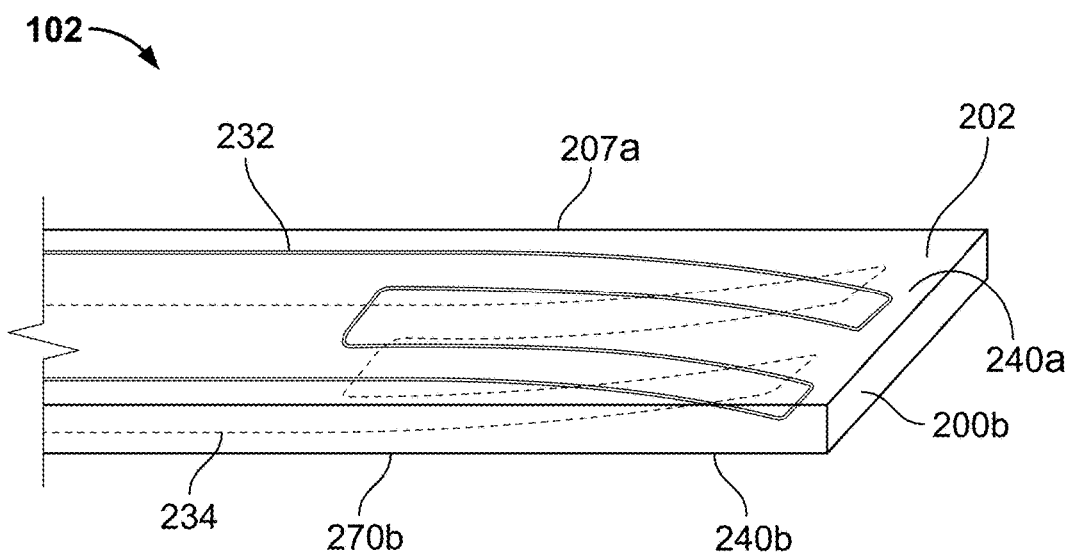
FIGS. 9A and 9B schematically illustrate other exemplary embodiments of the haptic actuator.
Figure 9B:
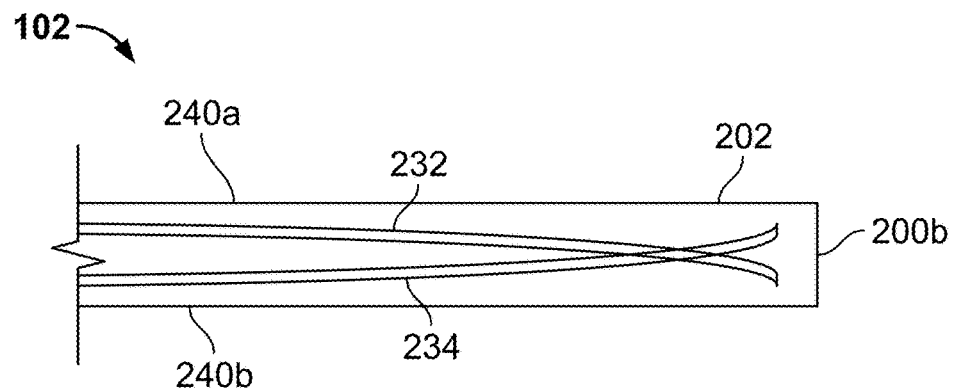

FIGS. 9A and 9B illustrate other alternative embodiments of the actuator 102. In these embodiments, the actuator 102 includes first and second channels 232 and 234, which are substantially similar to the channel 205. The first channel 232 (e.g., upper channel) is positioned proximal one surface 240a of the substrate 202 and the second channel 234 (e.g., lower channel) is spaced from the first channel 232 and positioned proximal an opposite surface 240b of the substrate 202 in a layered-type of arrangement. In the illustrated embodiment, the first and second channels 232 and 234 directly oppose each other and run parallel to each other. In alternative embodiments, however, the first and second channels 232 and 234 do not directly oppose each other and run orthogonally to each other, at an angle to each other, or in some other orientation relative to each other. In other embodiment, the first and second channels 232 and 234 can have any suitable positioned relative to each other. Other embodiments may have more than two channels. The independent channels 232 and 234 can be controlled together and in unison to create a stronger tactile sensation or controlled independently to create a greater variety of tactile sensations. Additionally, the first and second channels can be in fluid communication with a common reservoir for the fluid 205, or each channel 232 and 234 are in fluid communication with separate reservoirs.

As illustrated in FIG. 9A, the first and second channels 232 and 234 are positioned in planes that run parallel to each other and thus do not cross paths. In an alternative embodiment as illustrated in FIG. 8B, the paths of the first and second channels 232 and 234 cross over each other at least one point within the substrate 202.

Figure 10:
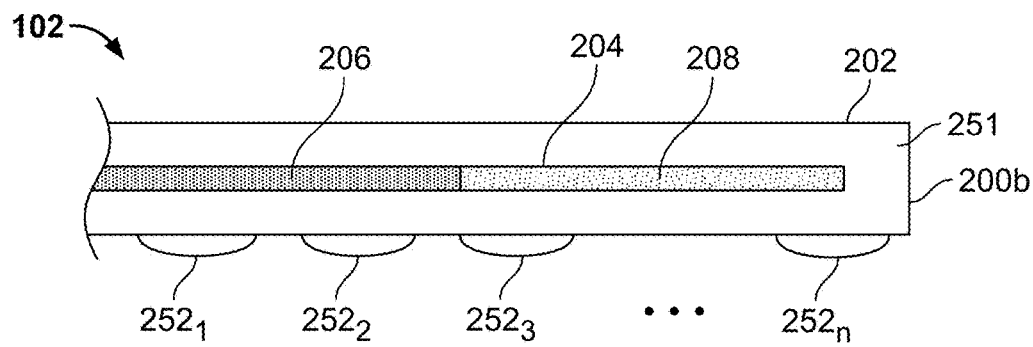
FIG. 10 is a schematic diagram of another exemplary embodiment of the haptic actuator.

FIG. 10 is a schematic diagram of another exemplary embodiment of the haptic actuator 102. In this embodiment, the substrate 202 of the actuator 102 includes a main portion 251 and one or more contact portions $252_1$-$252_n$ that are positioned along one surface of the substrate 202 that is intended to be positioned against or otherwise opposing a user's skin when the article 100 is worn by the user. The contact portions $252_1$-$252_n$ are configured to be less stiff and more flexible than the main portion 251 of the substrate 202. In exemplary embodiments, the contact portions $252_1$-$252_n$ are made of one or more materials different than the material used to form the main portion 251 of the substrate. As illustrated, the contact portions $252_1$-$252_n$ can include a plurality of pieces that are attached to the surface of the main portion 251 in a desired arrangement, or can include a plurality of protrusions that are integrally formed in a desired arrangement along the surface of the main portion 251. The contact portions $252_1$-$252_n$ provide a softer and more comfortable feel against a user's skin than the main portion 251 of the substrate, but still provide a tactile sensation to the user for the haptic effect. Alternatively, the contact portions $252_1$-$252_n$ can be stiffer and less flexible than the main portion 251.

In alternatives to the embodiment illustrated in FIG. 10, one or more portions of the channel 204 can run from the main portion 251 of the substrate 202 and through or near one or more of the contact portions $252_1$-$252_n$. The portions of the channel 204 that pass through or near the contact portions $252_1$-$252_n$ can have a different diameter than the portions of the channel 204 that pass the main portion 251. For example, the portions of the channel 204 that pass through or near the contact portions $252_1$-$252_n$ can have a smaller diameter than the portions of the channel 204 that pass the main portion 251.

Figure 11A:
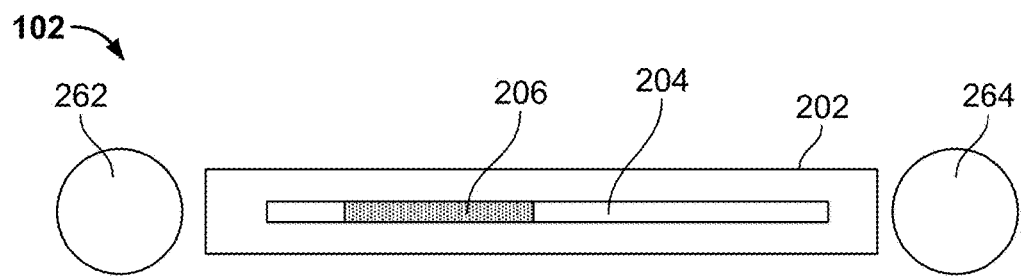
FIGS. 11A and 11B are schematic diagrams of yet another exemplary embodiment of the haptic actuator.

FIG. 11A is a schematic diagram of yet another exemplary embodiment of the haptic actuator 102. In this embodiment, the fluid 205 in the reservoir 210 and channel 204 is a liquid that contains molecules having ferrous properties so they are attracted to magnetic fields. Alternatively, the fluid 205 might be a ferrofluid that becomes magnetized in the presence of a magnetic field or other colloidal suspension having microscopic or nanoparticles that are disbursed throughout the liquid and do not settle. The fluid 205 also can be a magnetorheological fluid or other solution having suspended ferrous particles.

In this embodiment, coils 262 and 264 are positioned at opposite ends of the channel 204. In operation, the coils are wound in opposite directions so that the flux fields emanating from the energized coils point in the same direction and do not cancelled each other and are wired to the actuator drive circuit 114 so they have the same polarity. Alternatively, the coils 262 and 264 are wound in opposite directions and are wired to the actuator drive circuit 114 so they have opposite polarities. In operation, the coils 262 and 264 are energized, which creates a magnetic field that applies a magnetic force to the fluid 205 and causes it to move from the reservoir 210 and into the channel 204, which stiffens the substrate 202. The polarity of the coils 262 and 264 can be reversed, which reverses the direction or polarity of the magnetic field. The reversed polarity of the magnetic field causes the fluid 205 to flow from the channel 204 back into the reservoir 210, which reduces the stiffness and increases the flexibility of the substrate 202. Alternative embodiments might use only a single electrical coil.

Figure 11B:
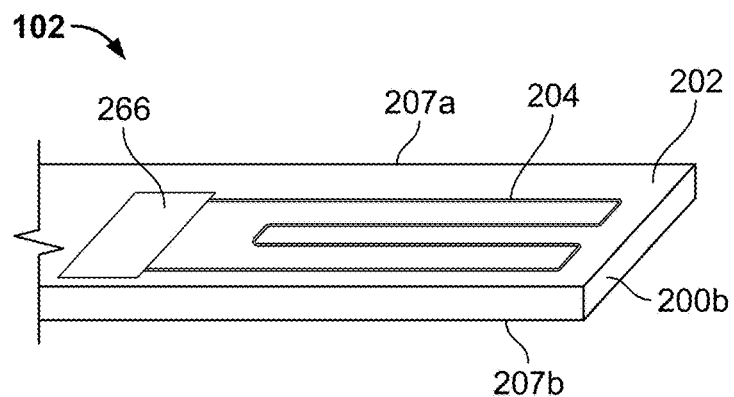

FIG. 11B illustrates yet another alternative embodiment of the actuator 102. In this embodiment, a pump 266 such as an electromechanical pump, is in fluid communication with a reservoir and the channel 204. The pump 266 can be on a microelectromechanical (MEMS) or even a nanoelectromechanical scale (NEMS). In operation, the actuator drive circuit 114 applies the drive signal to the pump 266 to move the fluid 205 from the reservoir 210 to the channel 204 and then back from the channel 204 to the reservoir 210. The pump 266 comprises first and second electromagnets positioned at opposite ends of the channel 204. The first and second electromagnets are in electrical communication with the controller 104.

Figure 12:
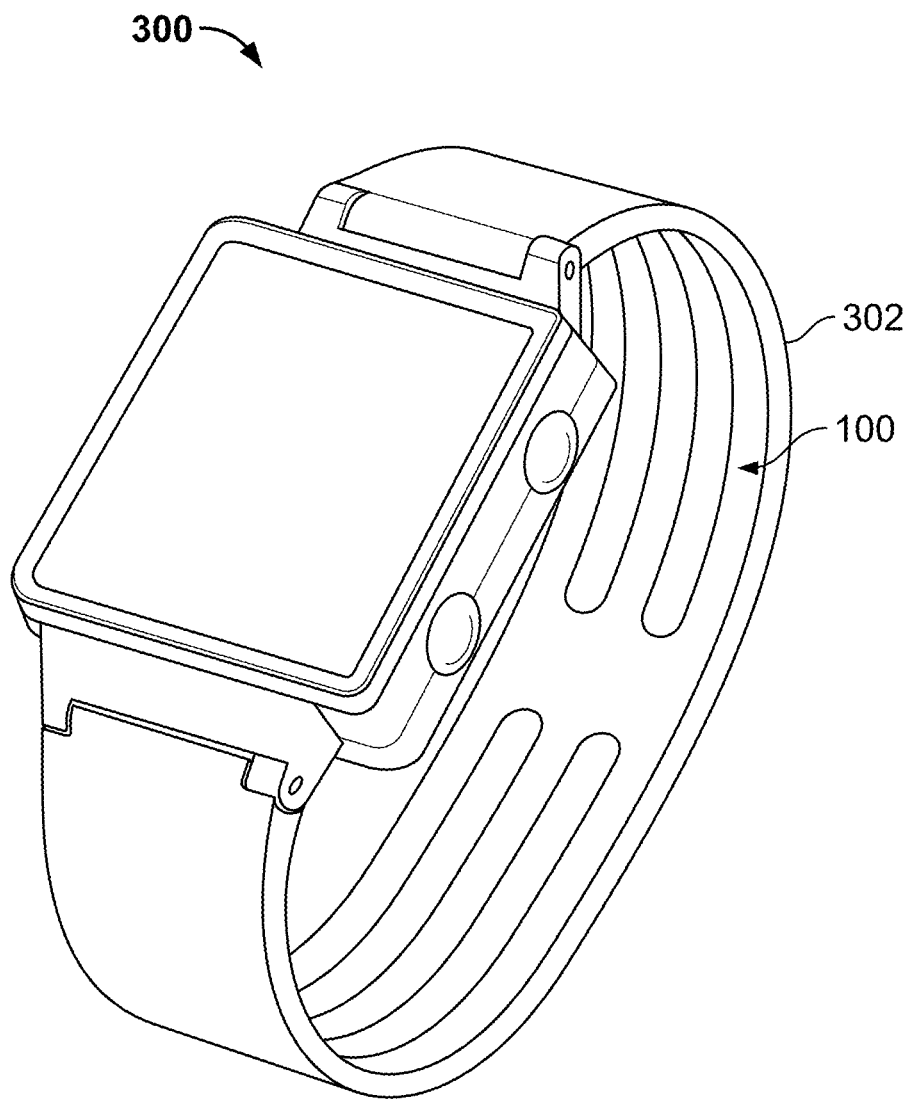
FIG. 12 schematically illustrates an example application of the haptic enabled device.
Figure 13:
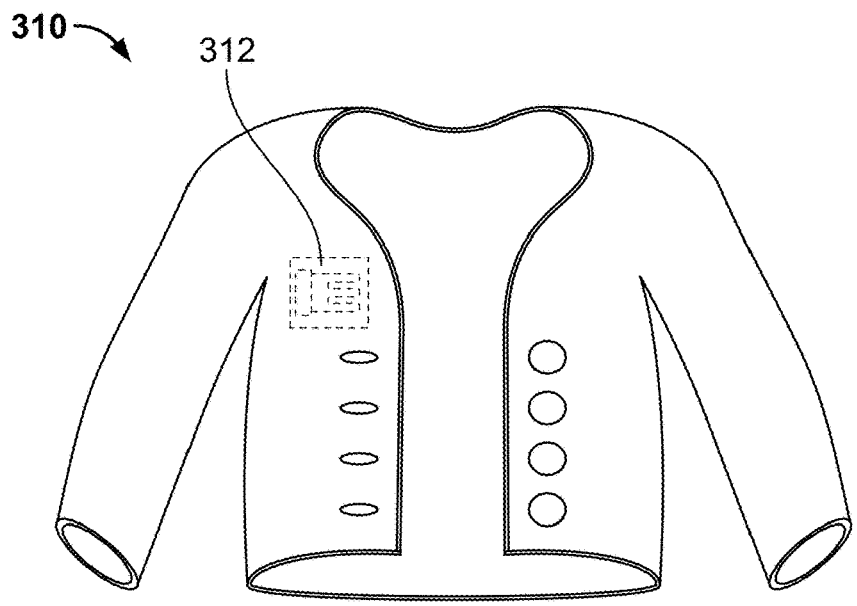
FIG. 13 schematically illustrates another example application of the haptic enabled device.
Figure 14:
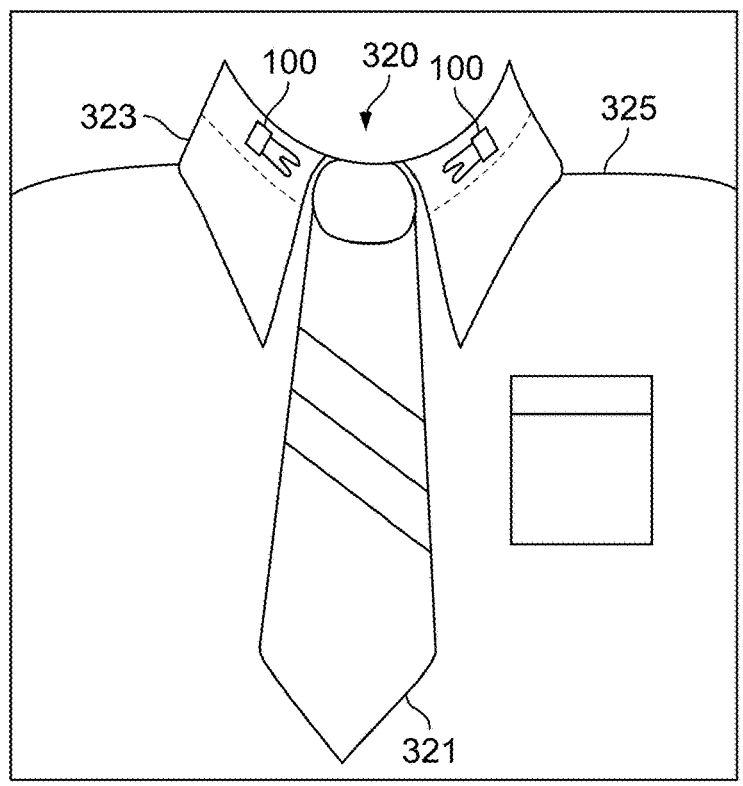
FIG. 14 schematically illustrates yet another example application of the haptic enabled device.

The actuator 102 disclosed herein, can be used in a variety of applications and in a variety of different haptic enabled articles 100. FIGS. 12-14 illustrate some of the many example applications of the haptic enabled article 100 as described herein.

The various embodiments of the haptic actuator 102 disclosed herein can be manufactured in various manners. In one manufacturing method, mold is created with a 3D printer. The mold is configured to provide the channel for the fluid. During manufacturing, one or more materials for the substrate are prepared and poured into the mold. After the materials are cured, the channel is filled with the fluid 205. The electrolyte is first injected into the channel. The liquid metal is then injected into the channel. In an alternative method, the actuator is directly produced by 3D printing. In this method, the 3D printer is used to form the substrate. As the substrate is being formed, the 3D printer will form the channel by printing the substrate material around the location of the channel. Additionally, the 3D printer will deposit the fluid in the channel as it is defined by channel. In this embodiment, the 3D printer will alternate between printing the substrate material and printing the fluid into the channel depending on whether the print head is located over an area designated for the substrate or an area designated for the channel.

Referring now to FIG. 12, the haptic-enabled article 100 is a wristwatch 300 having a watch strap 302. The actuator 102 is embedded in the watch strap 302. The controller 104 can be located in the wristwatch 300 or in the watch strap 302. In operation, when the controller 104 receives an input corresponding to a haptic event, it actuates the actuator 102. The liquid flows into the channels 205 of the substrate 202 causing it to stiffen, which in turn causes the watch strap 302 to stiffen. The user can feel the watch strap 302 stiffen around their wrist thereby being notified of the information embodied in the haptic effect. An example operation is a smart watch that receives text messages actuates the haptic actuator 102 notifying the user that a new message has been received. Another example might be a wristwatch 300 that has an alarm function. The wristwatch 300 will actuate the haptic actuator 102 when the alarm is triggered thereby notifying the user. Other examples, might involve activity or fitness trackers that actuate the haptic actuator 102 when certain events occur such as a measured heart rate rising above a threshold level (e.g., heart monitor function) or a certain number steps being taken by the user (e.g., pedometer function).

FIG. 13 illustrates another example in which the haptic-enabled article 100 is a garment 310 such as a shirt or a jacket. In this example, the haptic actuator 102 and controller 104 are positioned along the inside surface of the garment 310 so it is not visible to other people, although they can be located anywhere on the garment 310. In various embodiments, the haptic actuator 102 and the controller 104 can be mounted on a patch (not shown) that is in turn mounted on the garment 310, or the haptic actuator 102 and controller 104 can be connected directly to the fabric of the garment 310 itself. Additionally, the actuator 102 can be positioned at a variety of locations on the garment including collars, cuffs, and the main panel of the garment 310. FIG. 14 illustrates another example in which the haptic actuator 102 is mounted on a necktie 321 along one or more portions of the tie 321 that is likely to be positioned around the user's neck and under the collar 323 of a dress shirt 325. In this embodiment, the necktie 321 tightens around the user's neck when the actuator 102 becomes stiffer upon actuation thus delivering the haptic effect.

As described herein, the methodology and/or configurations of the present disclosure are used in various applications. For example, the haptic enabled device 100 of the present disclosure is applicable in a vibrating system. The methods described herein can be used to change the stiffness of a vibrating system. As the stiffness of a vibrating system changes, a vibrating system can have different resonant frequencies, thereby providing different haptic outputs.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A haptic enabled apparatus comprising:
a fluid;
a substrate being at least partially flexible and defining a contact portion that protrudes from a surface of the substrate and a channel in a main portion of the substrate,
the fluid moving within at least a portion of the channel extending through or near the contact portion,
the contact portion of the substrate generating a haptic effect in response to the fluid moving within the portion of the channel; and
a stiffness of the contact portion being less than or greater than a stiffness of the main portion;
a pump arranged to selectively move fluid through the channel; and
a controller electrically connected to the pump, the controller configured to deliver a signal to the pump, the signal embodying haptic information.

2. The haptic enabled apparatus of claim 1, wherein:
the substrate further defines a reservoir being in fluid communication with the channel.

3. The haptic actuator of claim 1, wherein:
the pump comprises first and second electrodes positioned at opposite ends of the channel, the first and second electrodes being in electrical communication with the controller.

4. The haptic actuator of claim 3, wherein:
the fluid is a liquid metal.

5. The haptic actuator of claim 1, wherein:
the pump comprises first and second electromagnets positioned at opposite ends of the channel, the first and second electromagnets being in electrical communication with the controller.

6. The haptic actuator of claim 5, wherein:
the fluid comprises particles selected from the group consisting essentially of ferrous particles and magnetic particles.

7. The haptic actuator of claim 1, wherein:
the pump is an electromechanical pump.

8. The haptic actuator of claim 1, wherein the fluid is selected from the group consisting of a ferrofluid and a colloidal suspension having nanoparticles disbursed throughout.

9. A method of generating haptics, the method comprising:
providing a signal to a pump configured to selectively move fluid through a channel defined in a flexible substrate, the signal including haptic information; and
moving the fluid, using the pump, within at least a portion of the channel extending through or near a contact portion defined in the flexible substrate,
the contact portion protruding from a surface of the flexible substrate,
the contact portion of the substrate generating a haptic effect in response to the fluid moving within the portion of the channel, and
a stiffness of the contact portion being less than or greater than a stiffness of the main portion.

10. The method of claim 9, further comprising:
generating an artificially-generated field, the artificially-generated field embodying the haptic information to communicate through the haptic effect,
wherein the artificially-generated field is an electric field or a magnetic field.

11. The method of claim 9, wherein
the pump further comprises first and second electrodes, and
the providing of the signal comprises:
generating an electrical signal, the electrical signal embodying the haptic information to communicate through the haptic effect;
applying the electrical signal to the first and second electrodes to generate an electric field; and
applying the electric field to the channel defined in the flexible substrate and the fluid.

12. The method of claim 9, wherein the moving of the fluid is in response to an artificially-generated field, and comprises
moving the fluid through the channel in one direction if the artificially-generated field has a first polarity, and
moving the fluid through the channel in an opposite direction if the artificially-generated field has an opposite polarity.

13. The method of claim 12, wherein the fluid includes a liquid metal.

14. The method of claim 13, wherein
the moving of the fluid through the channel in the one direction comprises depositing oxides on a surface of the liquid metal; and
the moving of the fluid through the channel in the opposite direction comprises removing the oxides from the surface of the liquid metal.

15. The method of claim 12, wherein
the moving of the fluid through the channel in the one direction comprises increasing the stiffness of the substrate; and
the moving of the fluid through the channel in the opposite direction comprises decreasing the stiffness of the substrate.

16. The method of claim 9, wherein the fluid is selected from the group consisting of a ferrofluid and a colloidal suspension having nanoparticles disbursed throughout.

17. A haptic-enabled apparatus wearable by a person, the apparatus comprising:
a wearable article;
a substrate being at least partially flexible and defining a contact portion that protrudes from a surface of the substrate and a channel in a main portion of the substrate,
the fluid moving within at least a portion of the channel extending through or near the contact portion,
the contact portion of the substrate generating a haptic effect in response to the fluid moving within the portion of the channel, and
a stiffness of the contact portion being less than or greater than a stiffness of the main portion;
a pump arranged to selectively move fluid through the channel; and
a controller electrically connected to the pump, the controller configured to deliver a signal to the pump, the signal embodying haptic information.

18. The haptic-enabled apparatus of claim 17, wherein
the pump comprises first and second electrodes positioned at opposite ends of the channel, the first and second electrodes being in electrical communication with the controller, and
the fluid comprises a liquid metal and an electrolyte.

19. The haptic-enabled apparatus of claim 17, wherein
the pump comprises first and second electromagnets positioned at opposite ends of the channel, the first and second electromagnets being in electrical communication with the controller, and
the fluid comprises particles selected from the group consisting essentially of ferrous particles and magnetic particles.

20. The haptic-enabled apparatus of claim 17, wherein the fluid is selected from the group consisting of a ferrofluid and a colloidal suspension having nanoparticles disbursed throughout.

* * * * *